INVENTOR
VINCENT R. LEARNED
BY
ATTORNEY

Patented Mar. 22, 1949

2,464,818

UNITED STATES PATENT OFFICE 2,464,818

FREQUENCY CONTROL SYSTEM

Vincent R. Learned, Hempstead, N. Y., assignor to The Sperry Corporation, a corporation of Delaware Application May 27, 1943, Serial No. 488,632

16 Claims. (Cl. 250—40)

My invention relates to automatic frequency control systems and is particularly concerned with highly sensitive methods and apparatus for exercising reliable corrective regulation in such automatic frequency control systems.

For purposes of illustration, the invention will be disclosed as specifically embodied in apparatus for maintaining a small fixed frequency difference between the outputs of two ultra high frequency oscillators of the cavity resonator type. A reliable apparatus of this nature has long been a recognized need in hollow resonator developments, as for obtaining two accurately spaced ultra-high frequency carriers for various purposes. It will be understood, however, that the invention is not so limited. In general, it may be applied to the control of apparatus involving any oscillators or other sources of alternating voltage to be frequency controlled. For example, it may be applied to apparatus wherein one of the sources is a crystal-controlled oscillator held to exact frequency and the other source is of variable frequency and to be held at a desired output frequency.

Since such resonator devices usually comprise mainly one or more metal-walled cavities, they are sensitive, for example, to vibrational and temperature changes and other factors which may more or less rapidly alter their resonant frequency. They are also sensitive to various other internal and external conditions affecting their frequency. Frequency deviations due to these factors and conditions may be large in magnitude as compared to the above-mentioned frequency difference which it is desired to maintain.

These resonators therefore require constant attention and frequent manual retuning unless automatic frequency control arrangements are provided. My invention in the specific embodiment to be described comprises an automatic control of this nature, which is practical and reliable even where the frequency difference to be maintained is very small relative to the individual frequencies and the relative frequency stability of the oscillators is poor.

United States Letters Patent No. 2,294,942 discloses a fixed frequency difference stabilization system embodying phase-sensitive control arrangements. While this system is generally operative, it is not readily adaptable for rugged work, and my present invention may be regarded as an improvement over the system in said patent.

My invention includes the discovery that certain conditions of operation of such a phase-sensitive frequency control circuit present problems which hitherto have not been recognized, and this invention relates to the recognition and solution of such problems.

It is therefore a major object of my invention to provide novel methods and apparatus for automatically maintaining substantially constant frequency output for an oscillator or like source.

It is a further object of my invention to provide novel methods and apparatus for reliably maintaining a fixed relation, such as a fixed frequency difference, between the outputs of high frequency sources such as oscillators. The invention is especially useful where the sources are ultra high frequency sources.

A further object of the invention is to provide a phase-sensitive control system of novel characteristics, for governing the output frequency of an oscillator or like source, or for maintaining a fixed frequency difference between the outputs of two sources.

It is a further object of the invention to provide an automatic frequency control system having novel network arrangements providing required attenuation and phase characteristics for stabilizing a feed-back control circuit in said system.

A further object of the invention is to provide an automatic frequency control system for an oscillator or like source including feedback arrangements embodying novel regeneration limiting and control features.

Another object of the invention is to provide novel tuning control arrangements especially useful in automatic frequency control apparatus.

A further object of the invention is to provide an automatic frequency control system including novel arrangements for automatically insuring that the frequency of a controlled source is maintained in predetermined relation to a reference frequency.

A still further object of the invention is to provide novel phase discriminator arrangements for comparing two frequencies.

A further object of the invention is to provide a novel tuning motor control circuit for an automatic frequency control system.

A further object of the invention is to provide an improved phase rotation indicator in novel correlation with an automatic frequency control system.

Further objects of the invention will presently appear in connection with the appended claims and the annexed drawings, wherein:

Fig. 11 is a wiring diagram illustrating a phase rotation indicator which may be combined with the circuit of Fig. 1 for indicating whether one of the two related frequencies is lower or higher than the other;

Figs. 12 and 13 are vector diagrams explaining the operation of Fig. 11; and

Figures 1, 1A, 1B, 1C, 2, 3:
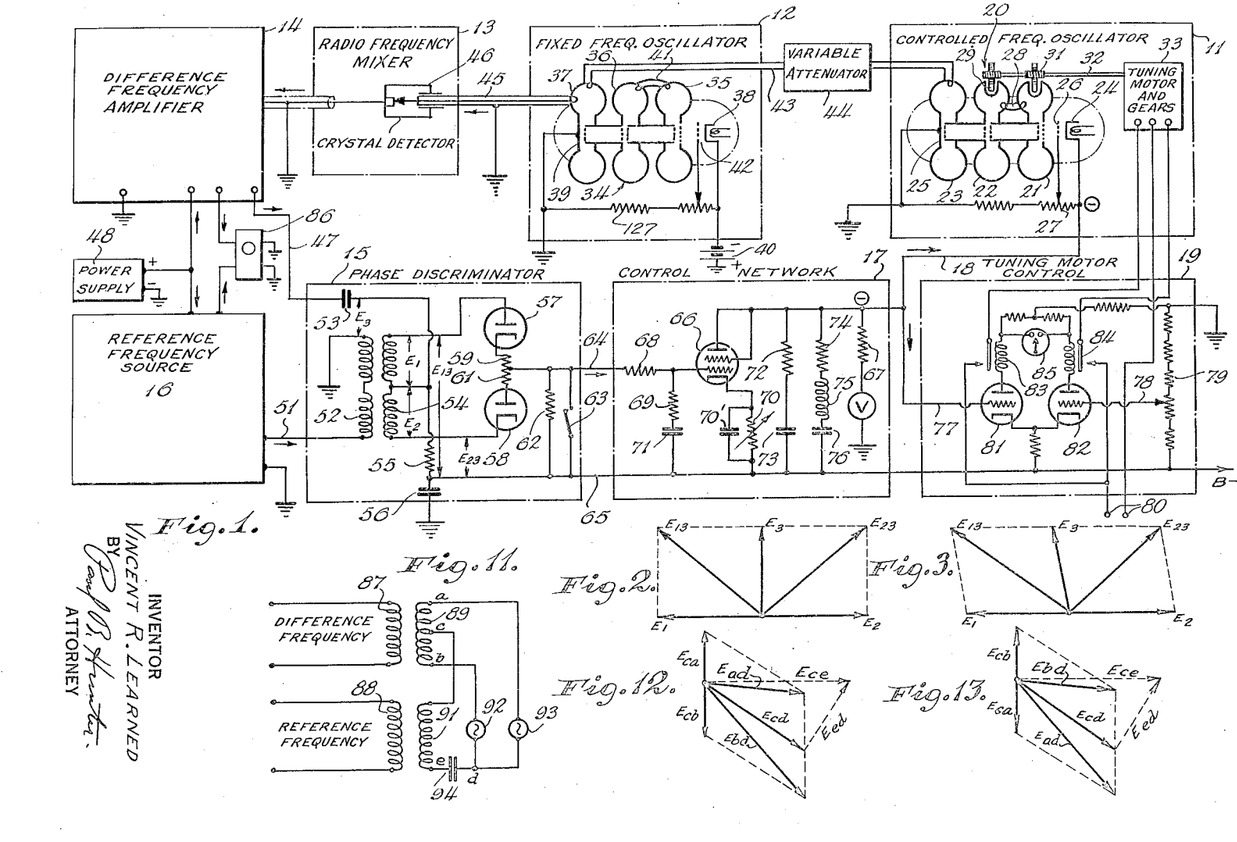
Fig. 1 is a combined schematic view and wiring diagram illustrating an automatic frequency control system according to a preferred embodiment of the invention.
Figs. 2 and 3 are vector diagrams illustrating operation of the discriminator of Fig. 1.

Referring to Fig. 1, wherein the dot-dash and solid line boxes indicate component parts of the system, the outputs of ultra high frequency sources 11 and 12 are combined in a conventional mixer 13 which produces the beat frequency of its two input waves. A suitable low pass filter is incorporated in mixer 13 and restricts the latter's output to a voltage having a frequency representing the difference between the frequencies of sources 11 and 12. It is this difference frequency, which in the preferred embodiment is usually in the audio range, that is maintained at a desired value by the illustrated system of the invention regardless of the relative stabilities of sources 11 and 12.

The difference frequency voltage is amplified at 14 and fed by way of conductor 47 into a phase discriminator 15 wherein it is compared with a voltage derived from a master audio frequency oscillator 16 maintained at a reference frequency corresponding to the desired difference frequency. Oscillator 16 may be of the well known crystal controlled type or any other type capable of extremely accurate regulation. When these compared frequencies are equal, and their voltages have a 90° phase relationship, there is no output from discriminator 15. When the relative frequencies of sources 11 and 12 during normal operation become such as to make the difference frequency smaller or larger than the reference frequency, the phase discriminator 15 acts as a frequency-change integrating device and delivers an output control voltage to the control network circuit 17 which acts through lead 18 and the tuning motor control circuit 19 to reestablish the required difference frequency interval.

The above is a brief summary of overall operation of the system. Details of the apparatus and operation necessary for a complete understanding of the invention will now be explained.

Source 11 comprises an oscillator 20 of the velocity modulation type having three spaced hollow resonators 21, 22 and 23 coupled by an electron beam projected therethrough between cathode 24 and collector surface 25. A control grid 26 connected to the adjustable tap of potentiometer 27 is disposed in the path of the electron beam and serves to control the beam intensity or current.

Resonators 21 and 22 perform the usual velocity-changing and energy-absorbing operations on the electron beam, with concentric line 28 feeding back high frequency energy from resonator 22 to sustain oscillations in resonator 21. As shown in Fig. 1, resonators 21 and 22 are simultaneously tuned as by displacement of tuning plugs 29 by gearing 31 driven by shaft 32 of tuning motor assembly 33. For detailed explanation of this type of two-resonator oscillator and the associated gang tuning, see United States Letters Patent No. 2,294,942. Any other equivalent manner of tuning the oscillator or other oscillators may be employed without departing from the broad spirit of the invention.

Resonator 23, into which the velocity modulated electron beam passes, functions as a buffer resonator. This type of buffer resonator is disclosed in said Patent No. 2,294,942.

Source 12 comprises an oscillator 34 of the velocity modulation type comprising spaced velocity-changing and energy-absorbing resonators 35 and 36, and buffer resonator 37, coupled by an electron beam projected between cathode 38 and anode 39. Resonators 35 and 36 are connected by feedback coupling 41 so as to maintain oscillations, and a control grid 42, similar to grid 26, is provided in the beam path. Control grid 42 is maintained at a potential intermediate those of cathode 38 and anode 39 by its connection to the adjustable tap of potentiometer 127 which is connected across a battery 40. In general, oscillator 34 is of the same construction as oscillator 20, except that the former need have no provisions for tuning.

Oscillator 34 is designed to operate at a desired frequency and although subject to frequency deviations due to temperature changes, vibration beam current irregularities and the like, it will be referred to herein as the fixed frequency oscillator. It may be replaced by any other source of high control frequency. Oscillator 20 will be referred to herein as the controlled frequency oscillator. The ultra high frequencies of the alternating electromagnetic fields within buffer resonators 23 and 37 are preferably in the order of $3 \times 10^9$ cycles per second or higher. In the present system, the output frequencies of oscillators 20 and 34 are made to differ by a desired interval which is very small compared to the absolute frequencies involved and which it is the purpose of the apparatus to maintain.

This interval, herein called the difference frequency, may be in the order of 10 kilocycles per second in the preferred embodiment and lies in the high audio range.

Buffer resonators 23 and 37 are interconnected by a concentric line 43 through a variable attenuator 44, and the combined outputs of oscillators 20 and 34 are fed by line 45 into mixer 13 which is illustrated as of the crystal detector type at 46. Sometimes two oscillators of this type, resonating at such closely related frequencies, tend to lock together and oscillate at a common frequency between their independent frequencies of oscillation. I may prevent this by interconnecting the oscillators through their buffer resonators, which insures that the load on the oscillators does not tend to alter their operating frequencies, as would be the case if mixer 13 were connected directly to each of resonators 22 and 36. This desired operation is further insured by introduction of at least a small amount of attenuation between the buffer resonators at 44, instead of using a direct connection. However, the use of buffer resonators is merely desirable and is not essential to the invention, as the latter is sufficiently reliable to exercise the required control even when buffer resonators 23 and 37 are eliminated and lines 43 and 45 are connected directly to the output resonators of the oscillators.

Mixer 13 is preferably a square law mixer of known type. Approximately linear detector action may be obtained in such a mixer if one of the voltages combined is chosen about ten times the other. This relation between the two source voltages may be obtained by means of attenuator 44, so that the voltage output from oscillator 20 entering resonator 37 is about one-tenth that of oscillator 34. While the illustrated crystal detector is preferred, any other type of detector may be used in mixer 13 without departing from the spirit of the invention; and, if desired, attenuator 44 may be eliminated.

The output of mixer 13 is an alternating voltage having a frequency the value of which, in accordance with the present invention, is to be maintained substantially equal to the desired difference frequency. This difference frequency voltage is amplified in difference frequency amplifier 14 and fed by lead 47 into phase discriminator 15. Amplifier 14, the purpose of which is solely to amplify the difference frequency voltage enough to operate the phase discriminator, may be of generally conventional construction, but certain design considerations should be observed for most efficient operation of the illustrated system. It is desirable that any phase shift in the amplified voltage be kept as small as possible, and that the high frequency response of the amplifier be good. It is immaterial for most control purposes that the low frequency response in the amplifier is poor.

The power supply for amplifier 14, indicated at 48, may serve also as the power supply for reference frequency oscillator 16, as shown. The output of oscillator 16 is an alternating voltage having an accurately maintained frequency equal to the required difference frequency. This voltage appears between ground and lead 51, which is connected to the transformer primary 52 in phase discriminator 15. The difference frequency voltage output of amplifier 14 is fed by lead 47 through a condenser 53 to the midpoint of transformer secondary 54 and then to ground through resistor 55 and condenser 56. Condenser 53 serves as a coupling and blocking condenser, since the phase discriminator operates at a high negative voltage.

The opposite ends of secondary 54 are connected to the anode and cathode, respectively, of diode rectifier tubes 57 and 58, and these tubes are connected in series through equal resistances 59 and 61. A suitable resistance 62 and a normally open short-circuiting switch 63 are connected across the output leads 64 and 65 from the discriminator 15. Lead 64 is connected between resistors 59 and 61, while lead 65 represents a common connection to a negative high voltage supply for the phase discriminator 15, control network 17 comprising the multigrid vacuum tube 66, and the tuning motor control 19, as indicated.

During operation of the discriminator 15, when the desired frequency difference prevails between oscillators 20 and 34, the difference frequency voltage on lead 47 is exactly equal in frequency to, and 90° out of phase with the reference frequency voltage. This relation is preselected by suitable choice of values for the circuit elements. The difference frequency voltage combines with the reference voltage across one-half of secondary 54 to represent the total voltage across each tube. Fig. 2 shows the vector combination of these voltages when the desired 90° phase relation is present, and vectors $E_{13}$ and $E_{23}$ show that the voltages across the tubes are then equal in magnitude. This means that the average current components through resistance 62 due respectively to the outputs of tubes 57 and 58 are equal and opposite, and there is no net unidirectional output voltage across resistor 62.

However, should the phase of the difference frequency voltage change, due for example to a disturbance in oscillator 20, the vectorial condition shown in Fig. 3 prevails due to the angular displacement of $E_3$, and the voltage across one tube 57 or 58 is larger than across the other. This means that a unidirectional current component equal to the difference between the unidirectional components of the rectified currents from rectifiers 57 and 58 flows through resistance 62, producing a net unidirectional voltage drop which applies a voltage between leads 64 and 65. The polarity of this voltage depends on the direction or sense of change of the phase of the actual difference frequency from its former value.

If the difference frequency voltage changes in frequency, this may be considered equivalent to a continuously changing phase, having a rate of change of phase corresponding to the change in the frequency. Since the phase discriminator responds to phase change, it will yield an increasing output as the phase of the difference frequency voltage continuously changes due to its change in frequency. Otherwise, the circuit operates in the same manner.

Switch 63, upon being closed, short-circuits resistor 62 and thereby prevents the entire frequency control system from operating.

The series-connected rectifier arrangement of my phase discriminator is advantageous because it provides a single-ended detector output voltage directly proportional to the phase relation with a minimum effect from residual parameters and eliminates the need for further circuit elements for converting from the double-ended output such as shown in Patent No. 2,294,942.

The purpose of multigrid vacuum tube 66, which is preferably a class A direct-current amplifier, is to amplify the output of the phase discriminator for use in controlling the frequency of oscillator 20. The cathode of vacuum tube 66 is connected to an adjustable cathode resistor 70 which is bypassed by the usual condenser 70', and thence to the B-voltage source by way of lead 65. Said vacuum tube 66 acts also as an impedance matching device between discriminator 15 and oscillator 20. The amplified output of vacuum tube 66 appears across resistance 67 and is connected by lead 18 to cathode 24 of oscillator 20. Thus the output of vacuum tube 66 controls the electron beam voltage and hence provides a fine tuning control for the frequency of oscillator 20. Lead 18 may be connected to grid 26 or any other suitable electron beam intensity control electrode without departing from the spirit of the invention.

The output of vacuum tube 66 is also connected to the tuning motor control assembly 19, as will later be described. First, however, the characteristics and operation of the fine tuning control through lead 18 will be discussed.

When exactly the required difference frequency and phase relation prevails, there is no output from discriminator 15, according to the operation thereof above described, and there is no control action. Should the difference frequency start to undergo a slow change, such as would be caused by a change in frequency in one of the oscillators in one direction or the other, the polarized direct current output of discriminator 15 acts through control network 17 to provide corrective voltage to alter the beam voltage in oscillator 20 to thereby change the oscillator frequency so as to restore the difference frequency to its desired value.

Furthermore, should one or more sudden and rapid disturbances in one or both oscillators 20 or 34 cause the difference frequency to fluctuate rapidly, the speedily responsive discriminator action causes rapid corrective voltage impulses to be delivered to control electrode 24.

These rapid corrective impulses in turn cause corrective frequency deviations in the output of oscillator 20 so as to oppose and substantially cancel the oscillator and difference frequency changes caused by the original disturbances. These corrective frequency deviations are directly dependent upon and substantially proportional to the amplitude of the corrective voltage across output resistor 67 and applied between lead 18 and ground.

By the above action, the output frequency of oscillator 20 and hence the difference frequency output of mixer 13 are varied by the corrective voltage applied to cathode 24 of oscillator 20. This variation in frequency can be considered as an effective frequency modulation of the difference frequency. The equivalent or effective modulating frequency producing this frequency modulation corresponds to the rate of change of the corrective voltage. That is for a slow variation in the corrective voltage, the difference frequency will change at a correspondingly slow rate, and can be considered to be and can be treated as a frequency modulated wave having a low modulating frequency. Similarly, for a more rapid variation in the corrective voltage, an effective frequency modulation of the difference frequency is produced corresponding to what would be produced by a higher modulating frequency. These equivalent modulating frequencies actually encountered are relatively low frequencies, of the order of audio frequencies. These low frequencies, which represent the differences between the original frequency changes initiating the correction and the frequency deviations caused by the corrective impulses, appear as alternating components in the correction voltage output of discriminator 15 and will be referred to hereinafter as such.

Using known frequency modulation theory and calculations, I have ascertained that these alternating components in the correction voltage output of the discriminator bear a 90° lagging phase relation to the modulation signal of the modulated output of oscillator 20, or of the difference frequency voltage, and that the amplitude of these alternating components is inversely proportional to the frequency of this modulation signal. The above phase relation factor is especially important in proper design of the invention, as will appear.

It will be seen that the system of Fig. 1 is essentially a feedback circuit, since a change in the frequency of oscillator 20 will operate through the circuit to produce a change in the cathode voltage of the oscillator to restore the proper difference frequency. The term "frequency correcting circuit" will be used to indicate the circuit consisting of oscillator 20, mixer 13, amplifier 14, discriminator 15 and control network 17. The gain of this frequency correcting circuit may be considered to be the ratio of the equivalent modulating voltage impressed on the oscillator 20 to the output voltage of control network 17.

Due to the nature of my frequency correcting circuit, the alternating components of the correction voltage just discussed are subjected to considerable amplification while passing therethrough. To stabilize the whole circuit against self-oscillation, this correction voltage cannot be applied directly to oscillator 20, but the gain of the frequency correcting circuit must be properly compensated. In compensating for this gain, care must be taken to properly relate attenuation with frequency, since at the higher rates of attenuation which may prevail when the modulation frequencies in the output of oscillator 20, and hence the frequencies of the alternating correction voltage components, are high, these alternating components are appreciably phase delayed and may approach a condition where they will be in phase with the modulation signal of the modulated output of oscillator 20. If such a condition is reached, the action becomes regenerative and builds up oscillation in the frequency correcting circuit, thereby rendering the system unstable. This condition must be avoided as is done by the following feedback circuit design.

The frequency correcting circuit design

The frequency correcting circuit may be regarded as a negative feedback loop, and known feedback loop amplifier principles may be employed in its design.

Figure 4:
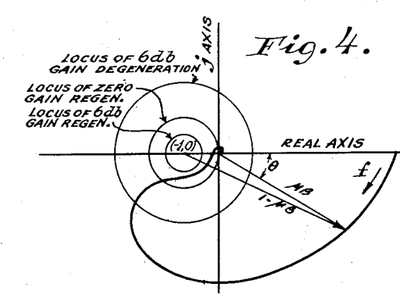
Fig. 4 is an explanatory polar coordinate diagram for illustrating certain principles of the invention.

Accepted basic requirements for stabilization of ordinary feedback amplifier circuits are explained in an article entitled "Regeneration Theory" by H. Nyquist, published in the Bell System Technical Journal of January, 1932, volume II, pp. 126–147. A Nyquist stability diagram of the form applicable to the system of the invention is shown in Fig. 4. On such a diagram is plotted, in polar coordinates, a desirable form of attenuation versus phase shift characteristic for my frequency correcting circuit for varying modulation frequencies, or frequencies of the A.-C. components of the discriminator output voltage. According to convention, the radius vector from the origin to a particular point of the plot represents the absolute value of the circuit gain for the frequency corresponding to that point, and the angle θ measured clockwise from the positve real axis represents the lagging phase shift of the circuit for that frequency. As the frequency changes, the entire plot is traced. This diagram per se is further explained in United States Letters Patent No. 1,915,440 granted to Harry Nyquist on June 27, 1933.

For stability in such systems, it is necessary that the polar plot of the circuit or loop gain and its conjugate do not encircle the point (—1,0) which represents the point of regeneration with infinite gain in the Nyquist diagram. To satisfy this requirement, the phase shift of the alternating correction voltage components must be held to less than 180° in my frequency correcting circuit for values of the magnitude of the circuit gain approaching unity. This is complicated by the fact that a definite relation exists between the variation of attenuation with frequency and such phase shift, as later discussed.

The net gain in any such feedback loop as used in the present case may be expressed by the relation:

$$\text{Net gain} = \frac{\mu}{1-\mu\beta}$$

where $\beta$=the fraction of the output fed back to the input, and $\mu$=the gain of the loop without feedback. Both $\mu$ and $\beta$ have phase angles and their vector product $\mu\beta$, referred to hereinafter as the feedback factor, may become very high. To obtain degenerative or stabilizing action, $\mu$ is positive and $\beta$ is negative, thereby making $1-\mu\beta$ greater than 1 and producing a gain reduction and stabilizing effect. If $1-\mu\beta$ should approach zero, the net gain approaches infinity, resulting in instability of the system. This must be avoided.

The term $1-\mu\beta$ is represented by the vector centered on (—1,0) in the Nyquist diagram. With reference to Fig. 4, if $1-\mu\beta$ is greater than 1, there is degeneration; and, if it is less than 1, there is regeneration. It is desirable to operate a feedback device with a minimum of its loop gain characteristic passing through this region of regeneration. As a practical matter this is difficult, but by careful design it is possible to avoid severe regeneration and keep regeneration to a minimum over a considerable portion of the frequency spectrum.

In known network theory literature, it has been shown that a circuit having a uniform gain reduction of one decibel per octave of the frequency spectrum has a lagging phase shift of 15 degrees at all frequencies. As discussed above, the frequency correcting circuit thus far described produces a phase shift of 90° between the modulation on the output of oscillator 20 and the output of discriminator 15, which therefore corresponds to an inherent attenuation variation in the frequency correcting circuit of six decibels per octave.

Due to the high sensitivity of the phase discriminator 15 and to the gain of amplifier 14, the gain of the frequency correcting circuit, exclusive of network 17, is very large, especially for low values of the effective modulation frequencies resulting in alternating correction voltage components. This gain may amount to as much as 120 db at one or two cycles per second. With the inherent 6 db per octave variation of attenuation just discussed, this gain is reduced relatively little with increasing frequency. In particular, the actual difference frequency may not be completely attenuated. If such is the case, the output of oscillator 20 will be modulated by this frequency, resulting in sidebands which may be undesirable.

These undesired sidebands may be substantially eliminated by increasing the difference frequency to a value which is substantially completely attenuated by the inherent 6 db per octave attenuation. However, this limits the minimum frequency separation of the two oscillators 20 and 34. Where lesser values of separation are desired, recourse may be had to the control networks 17 shown in Fig. 1, as will be explained. The undesired sidebands, as well as the higher frequencies in the alternating components of the discriminator output voltage may properly be attenuated by suitably increasing the inherent 6 db per octave variation in attenuation with frequency of the frequency correcting circuit. There are, however, practical limits which must be observed when such increase is made, in order to maintain control through the frequency correcting circuit.

As mentioned above, during attenuation it is necessary to keep the total phase shift of the alternating components in the discriminator output voltage below 180° to avoid regeneration or oscillation in the frequency correcting circuit, which is equivalent to preventing too great delay in applying the corrective voltage to oscillator 20. As a factor of safety to allow for unpredictable phase shifts, such as due to stray capacitances, etc., it is desirable to design for a maximum phase shift of about 150° rather than the absolute maximum of 180°. For a phase shift of 150°, the corresponding variation of attenuation with frequency would be 10 decibels per octave. Thus, the inherent attenuation variation of my frequency correcting circuit may safely be increased by 4 decibels per octave. The proper selection and insertion of an attenuation stepping-up network or networks into the frequency correcting circuit is important to insure that the maximum permissible 10 decibels per octave attenuation rate is not exceeded.

Figure 5:
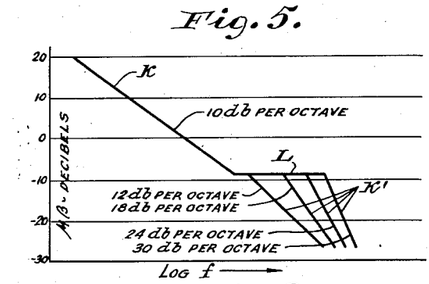
Fig. 5 is a graph illustrating an ideal attenuation variation curve for accomplishing certain purposes of the invention.

Figure 5 illustrates theoretically desirable attenuation characteristics of my frequency correcting circuit. Curve K has a 10 db per octave slope as shown on the plot of Fig. 5 and has a region of zero slope L, after which the curve may continue at a slope selected according to desired attenuation characteristics for higher frequencies, several such slopes being indicated at K′.

The region L of zero slope represents a break in the variation of attenuation with frequency, the purpose of which is to counteract phase shift in the vicinity of the point (—1,0) of the diagram of Fig. 4 and to make the feedback circuit gain characteristic avoid the unstable regeneration region of that diagram as much as is practically possible. The beginning of region L is preferably at a point about one octave higher in frequency than the frequency for which $\mu\beta$ is unity. The frequency range of the zero attenuation variation region L is proportional to the slope of the selected curve slope therebeyond as illustrated.

One manner of choosing networks for accomplishing these desired attenuation characteristics will now be explained. I have found that a simple resistance and condenser network shunted across leads 64, 65 will give an inverse output vs. frequency response, corresponding to a continuous variation of attenuation with frequency, but will add an attenuation variation with frequency of 6 decibels per octave. This will total to a variation in attenuation with frequency of 12 decibels per octave in the frequency control circuit, which is undesirable because it does not allow the above-mentioned safety factor for unpredictable phase shifts. Hence it is necessary to provide other network arrangements for obtaining the desired workable attenuation variation.

I have found that in the illustrated embodiment of the invention a properly designed network comprising a resistance in series with a condenser or inductance and employed to shunt a resistive circuit will approximately provide the desired variation in attenuation over a limited frequency range. In my frequency control circuit, I may utilize several such networks connected in tandem and matched progressively as to frequency range so that combined they provide approximately the desired variation in attenuation over the entire frequency range encountered in the frequency control circuit.

Figure 6:
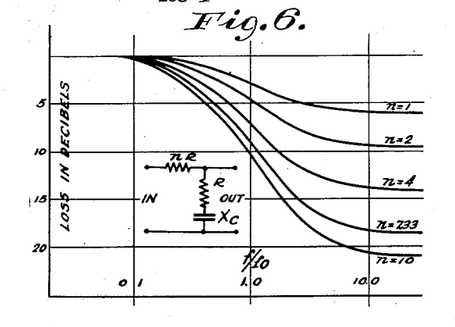
Figs. 6 and 7 are graphs illustrating associated attenuation and phase shift characteristics, respectively, of resistance-capacity networks which may be employed in the feedback circuit in the invention.
Figure 7:
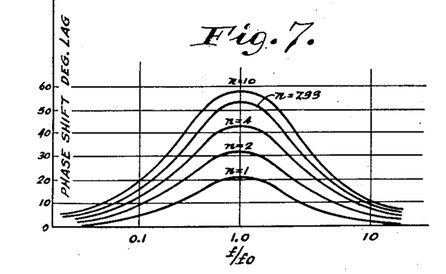

A resistance-condenser network of this kind, designated herein as an R-C network, is shown in Fig. 1 between the discriminator output and the control grid of control vacuum tube 66 in association with a resistive circuit containing resistance 68, and comprises resistance 69 and condenser 71 in series with each other and shunted across the resistive circuit. Another R-C network comprising series-connected resistance 72 and condenser 73 is shunted across the output circuit of vacuum tube 66. The individual attenuation and phase characteristics of such R-C networks are shown in Figs. 6 and 7. The ratio of resistance 69 to resistance 68, or resistance 72 to 67, as the case may be, gives a parameter $n$ for the several curves that determines the variation in attenuation with frequency. This is given approximately by the relation:

Maximum Attenuation Rate=
$$\frac{6n}{n+2} \text{ decibels per octave}$$

The reactance of condensers 71 and 73 at the mid-frequency $f_0$ of the corresponding network is determined by the relation $X_c = R\sqrt{N+1}$, where R is the resistance of resistor 69, or 72, as the case may be.

In Figs. 6 and 7, the ratio of $f/f_0$ gives the relative frequency with respect to the nominal mid-frequency of the network. As shown in Fig. 7, the phase shift increases as $n$ is increased.

The curves of Figures 6 and 7 are used by first drawing the desired ideal attenuation characteristic curve similar to Fig. 5, and then selecting and associating such networks as will give the desired variation in attenuation over successive frequency ranges. This is usually accomplished by locating along the ideal curve the various spaced mid-frequency points $f_0$ of the networks to be used, and then referring to the curves of Figures 6 and 7 for the networks having suitable attenuation and phase shift characteristics.

The above procedure is satisfactory for obtaining a frequency correcting circuit having the desired 10 db per octave variation in attenuation with frequency, but it does not provide a zero slope region such as that at L in Figure 5.

Figure 8:
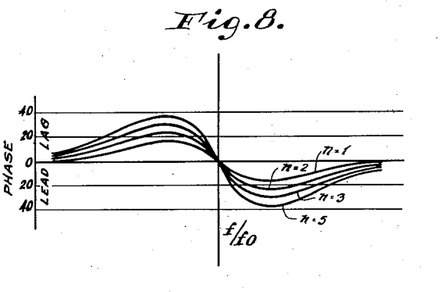
Figs. 8 and 9 are graphs illustrating associated attenuation and phase shift characteristics, respectively, of resistance-inductance-capacity networks which may be employed in the feedback circuit in the invention.
Figure 9:
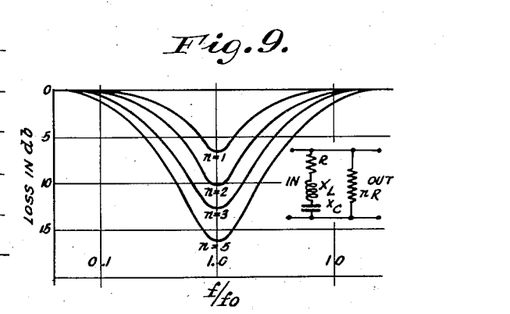

Figs. 8 and 9 illustrate design curves giving design information for a series resonant network which may be used for this purpose in the circuit. In Fig. 1 such a series resonant network, hereinafter called a R-L-C circuit, is indicated by resistance 74, inductance 75 and condenser 76 in series with each other and shunted across the output of vacuum tube 66. This circuit may be matched with the R-C networks. In such R-L-C networks, in addition to the parameter $n$, there is another parameter $Q$ which determines the sharpness or broadness of its characteristics. This parameter $Q$ relates the magnitude of $X_c$ and $X_L$ to R at $f_0$ by the relation $X_c = X_L = QR$. The curves of Fig. 8 show the phase shift characteristic of such a network.

Figure 10:
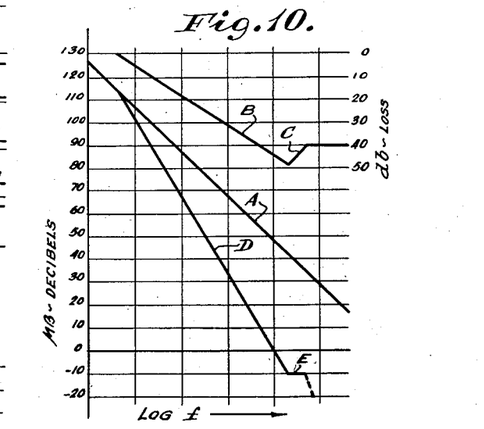
Fig. 10 is a graph illustrating the manner in which the inherent feedback circuit attenuation characteristics combine with those of the inserted networks to obtain a resultant attenuation variation curve approximating the ideal of Fig. 5.

Fig. 10 illustrates the actual effect of inserting the R-C and R-L-C networks in the frequency correcting circuit of Fig. 1. The inherent inverse frequency vs. attenuation characteristics represented by line A, which has a slope of 6 decibels per octave, combines with the inserted network attenuation characteristic represented by line B, which has a slope of about 4 decibels per octave due to the R-C networks and a sudden decrease in slope at C due to the sudden decrease in attenuation at the higher frequencies provided by the R-L-C network, to give the resultant attenuation characteristic of the feedback loop represented by line D. The slope of line D is about 10 decibels per octave and line D includes a region E of zero attenuation rate corresponding to that at L in the ideal curve of Fig. 5.

The above sets forth the theoretical and design requirements necessary for obtaining the desired attenuation characteristics in my frequency control circuit. An attendant advantage of using an R-C network between the discriminator output and the control grid of vacuum tube 66 is to attenuate any very high frequency components in the discriminator output such as due to difference frequency ripple in the discriminator output. An advantage attendant to the R-C network located across the plate circuit of vacuum tube 66 is to reduce the impedance of the circuit so that the effects of stray capacity are pushed to a higher frequency. Condensers 73 and 76 also prevent short-circuiting of the direct current circuit of vacuum tube 66.

In a specific embodiment of the described invention, wherein the modulation frequencies due to correction voltage impulses reach only a maximum of about 10 kilocycles, I design one R-C network 68, 69, 71 to have a mid-frequency in the medium audio range, about 300 cycles per second, the other R-C network 72, 73 to have a mid-frequency in the low audio range, about 30 cycles per second, and the series resonant circuit to have a resonant frequency in the high audio range, at about 20,000 cycles per second. Of course, any other desired arrangements may be employed as desired.

Where the correction voltage fluctuations cause frequency modulation producing alternating components of 10 to 100 cycles per second in the discriminator output, substantially only the R-C circuit 72, 73 attenuates the correction voltage gain and the other inserted networks are substantially passive. Similarly, the other R-C network and the R-L-C network becomes successively active to attenuate the gain when the modulation frequency reaches their limited range.

My frequency correcting circuit of Fig. 1, therefore, functions to positively and reliably control the frequency of oscillator 20 and maintain the desired difference frequency. It is effective to reliably maintain smaller difference frequencies than any prior arrangements of which I have knowledge. Its control is effective and positive for large and rapid corrective impulses transmitted to oscillator 20, and is practically instantaneous in action. There is no appreciable over-control, or fluctuation about the control point, because of the effective damping produced by the controlled attenuation rate in the feedback circuit. Furthermore, undesired side frequencies are effectively reduced in the frequency correcting circuit. The net frequency controlling ability for long periods of time approaches infinity because of the phase comparing qualities of the frequency controlling current.

I have above described in detail a frequency control circuit for maintaining a fixed frequency difference between two oscillators of the cavity resonator type, which circuit is reliable and positive and automatically adapts itself to changing rate of control attendant to these conditions. The same principles are equally applicable for maintaining any oscillator at fixed frequency, or a fixed frequency difference between any two oscillators.

My frequency correcting circuit may be reliably employed in a superheterodyne receiving circuit for controlling the frequency of the local oscillator, a use for which its special sensitivity is admirably adapted.

The gain adjustment of amplifier 14 may be employed as a fine adjustment for the frequency corrective circuit.

Motor tuning

Where the system is to be operative over a long period, it is desirable to employ motor-controlled tuning of the controlled frequency oscillator in addition to the above, for maintaining that oscillator in optimum operating condition at substantially all times, and Fig. 1 includes such an arrangement. In tuning motor control assembly 19, the correction voltage derived from control vacuum tube 66 is compared with a like steady voltage derived from voltage divider 79. Leads 77 and 78 apply these voltages to the control grids of tubes 81 and 82, respectively, and relays 83 and 84 in the plate circuits of the tubes control the direction of rotation of motor 33. A meter 85, such as a zero-center galvanometer, serves as a tuning indicator. The energizing voltage for the motor 33 is applied at terminals 80.

The voltage supplied to tube 82 from voltage divider 79 is selected so that, when there is no output from vacuum tube 66, the motor control circuit is balanced and neither relay is actuated. When there is an output from vacuum tube 66, the motor control circuit operates to energize the tuning motor in the proper direction to tune oscillator 29, and the system returns to rest when the original disturbance has been overcome by the retuning. Since motor tuning control is relatively slower than the direct beam voltage control, the chief advantage of the motor tuning is to take care of large or sustained drifts in the difference frequency, thus keeping the controlled oscillator in an optimum operating condition. The motor control, by taking care of tendencies of the difference frequency to drift, also insures against the presence of undesirable large direct current components in the discriminator output.

Monitor devices

A cathode ray oscilloscope assembly 86 may be provided for continuously monitoring the difference frequency and reference frequency voltages during operation of the system. These voltages may be applied to respective pairs of deflecting plates of the oscilloscope. Then with the voltages in normal 90° phase relation, the screen pattern is a circle and may be observed in connection with a suitable fiducial mark. If the voltage to one set of plates is shifted 90°, a straight line indication is obtained, which has a positive or negative slope depending upon the direction of phase rotation. For less than 90° shift, the circle becomes an ellipse.

Fig. 11 illustrates a phase rotation detector and indicator which may be employed in or attached to the circuit of Fig. 1 to indicate on which side of the normal operating frequency of the fixed frequency oscillator 34 the controlled frequency oscillator 29 is operating. This is important because the illustrated system of the invention works equally well regardless of which frequency is the larger, and becomes stable at the desired frequency difference when the controlled frequency approaches the fixed frequency from either side. I have further noted that reversing the polarity of the feedback loop does not affect operation of the system, but only affects the relative indication of the phase rotation indicator.

The indicator of Fig. 11 shows the leading or lagging phase relation between the reference frequency and difference frequency voltages. Connections to suitable terminals in Fig. 1 are indicated, but Fig. 11 is here made separate from Fig. 1 for the sake of simplicity of the drawing. Operation of the indicator depends on my discovery that the phase of the difference frequency voltage changes from plus to minus 90° with respect to that of the reference voltage of oscillator 16 depending on the side of the fixed frequency oscillator that the controlled frequency oscillator is operating. Thus the indication of the phase indicator informs the operator of the existing frequency relation between the sources 11 and 12, i. e. which is of higher frequency.

The particular phase rotation device of Fig. 11 is illustrated mainly by way of example to show that any equivalent phase rotation indicator may be employed in the invention. In Fig. 11, the difference frequency and reference frequency voltages are impressed on the respective primaries 87 and 88 of transformers having secondaries 89 and 91, respectively. One end of secondary 91 is connected to the midpoint of secondary 89, and the opposite ends of secondary 89 are connected through low drain indicator lamps 92 and 93 to condenser 94 and the other end of secondary 91. Condenser 94 serves to phase shift the reference voltage, preferably about 45°.

In operation, the indicator circuit causes greater illumination of lamp 92 when the phase of the difference frequency voltage is 90° to one side of that of the reference frequency voltage, and causes greater illumination of lamp 93 when the difference frequency voltage phase is on the other side of the reference frequency voltage phase. This, as above explained, is an indication of the relative frequencies of the sources 11 and 12.

Figs. 12 and 13 are vector diagrams, which taken with Fig. 11, illustrate the manner in which the voltages applied to the lamps depends on the phase relation of the difference frequency voltage.

The phase-shifted reference frequency voltage $E_{cd}$ is combined with the difference frequency voltage components $E_{ca}$ and $E_{cb}$ as illustrated, and the resultant voltage $E_{ad}$ and $E_{bd}$ across the lamps 93 and 92 are respectively large and small depending on whether the phase of the difference frequency voltage is as shown in Fig. 12 or 180° different as shown in Fig. 13.

Instead of one or the other of lamps 92 or 93, suitable control means may be provided for preventing initiation of operation of the system with the controlled frequency on the wrong or undesired side of the fixed frequency, as is explained below.

Side frequency control

Figure 14:
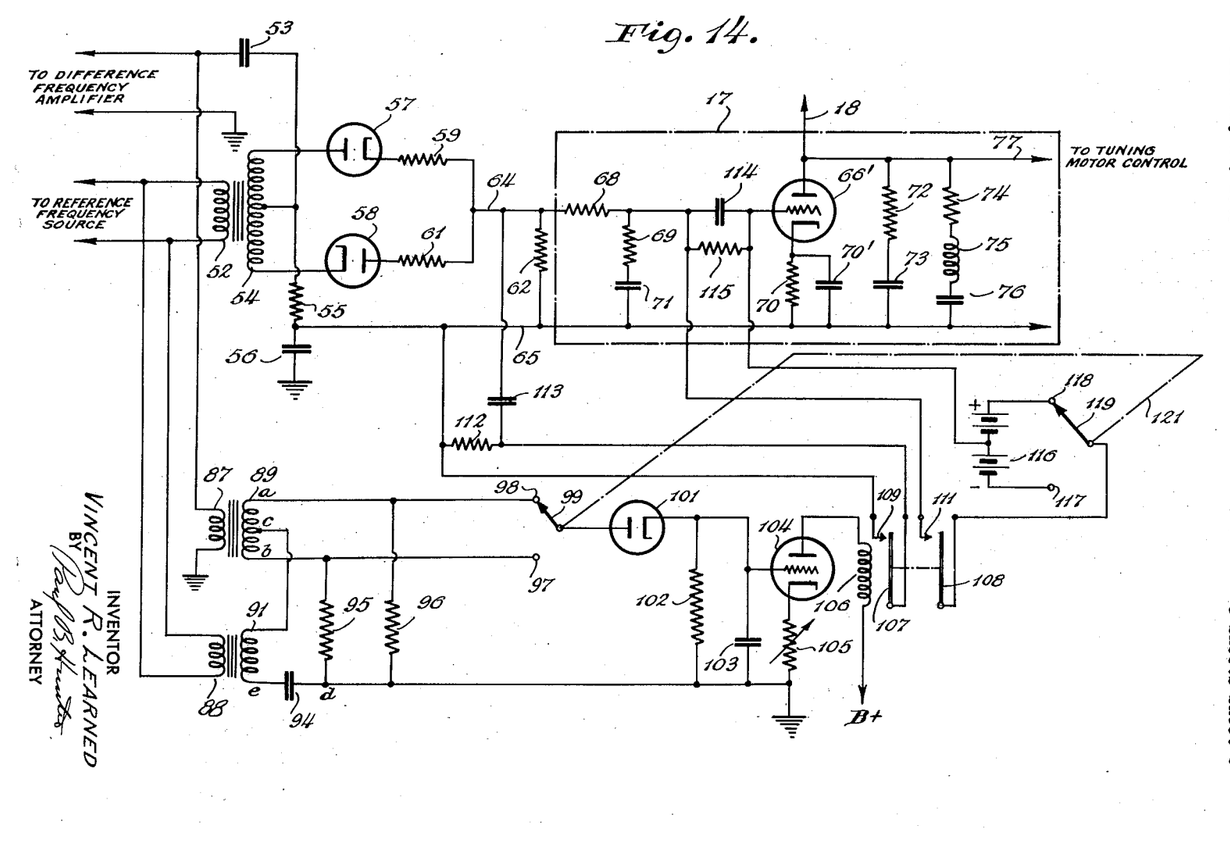
Fig. 14 is a wiring diagram illustrating automatic arrangements for insuring that the controlled frequency is maintained on the proper side of the reference frequency in Fig. 1.

Fig. 14 illustrates an automatic arrangement whereby the phase rotation detector of Fig. 11 may be incorporated with the circuit of Fig. 1 to automatically insure that the controlled frequency locks in on the desired side of the fixed frequency.

The difference frequency and reference frequency voltages are supplied across transformer primaries 87 and 88 as in Fig. 11. Also, similarly to Fig. 11, the mid-point of transformer secondary 89 is connected to one end of secondary 91, and the opposite ends of secondary 89 are connected through resistors 95 and 96 and condenser 94 to the other end of secondary 91. Resistors 95 and 96 are preferably equal and correspond to lamps 92 and 93 of Fig. 11. Thus the vector diagrams of Figs. 12 and 13 apply also to Fig. 14, the voltage $E_{ad}$ being impressed across resistor 95, and the voltage $E_{bd}$ being impressed across resistor 96.

Resistors 95 and 96 are connected to ground at one end and at their other ends to switch terminals 97 and 98 respectively. A pivoted switch blade 99 adapted to be manually shifted into contact with either terminal 97 or 98 is connected to the plate of a diode rectifier 101 whose cathode is connected to ground through a time delay network comprising a resistor 102 and a condenser 103. Manipulation of blade 99 determines whether the voltage across resistor 95 or the voltage across resistor 96 is rectified by diode 101, and used for control purposes.

The rectified output of diode 101 is connected to the control grid of an amplifier tube 104 which has a variable cathode bias resistor 105 for controlling operating bias of the tube. The output of amplifier 104 actuates a relay device comprising a solenoid coil 106 and a pair of pivoted switch arms 107 and 108 operated thereby and located opposite contacts 109 and 111 respectively. As shown in Fig. 14, arms 107 and 108 are mechanically interconnected for simultaneous movement, but the contacts are so located that a circuit is established through switch 107, 109 a predetermined time before a circuit is established through switch 108, 111.

Switch 107, 109 has its terminals connected across a large resistor 112 which in turn is connected in series with a condenser 113 across the discriminator output leads, 64, 65. When switch 107, 109 is open, the discriminator output exercises its normal control functions above described, resistor 112 being sufficiently large to precharge condenser 113 to the average discriminator output voltage. However, when switch 107, 109 is closed, resistor 112 is bypassed and the discriminator rendered ineffective to control triode 66'. The discriminator output is not directly short circuited, however, because it is desired to maintain the frequency correcting circuit at the attained control level. The purpose of this arrangement will later appear.

In control network 17, a suitable condenser 114 is inserted in series with the control grid of triode 66'. A resistor 115 is connected across condenser 114, to form therewith a suitable time delay network. One terminal of resistor 115 is connected to switch contact 111, and the other end of resistor 115 is connected to the midpoint of a voltage source 116 having spaced terminals 117 and 118 of opposite polarity. A switch blade 119 electrically connected to switch arm 108 is pivoted for selective contact with either terminal, and is connected by a suitable mechanical linkage indicated at 121 for gang operation with switch blade 99.

With switch blade 119 on either terminal 117 or 118 when switch 108, 111 is closed, condenser 114 will be charged through resistor 115. Shifting blade 119 from one terminal to the other changes the polarity of the charging voltage, for a purpose which will be explained.

In operation, assume that the desired relation between the oscillator frequencies is that the frequency of controlled oscillator 20 be maintained lower than the frequency of fixed oscillator 34 by the required difference frequency. Assume also that the phase of the difference frequency voltage is such as to produce the relationships indicated in Fig. 12 when the above assumed desired relation exists, in which case the voltage across resistor 95 is larger than the voltage across resistor 96.

The control circuit comprising amplifier 104 may be suitably biased to operate upon connection of blade 99 to either switch contact, that is the operator may choose which of the two voltages ($E_{ad}$ or $E_{bd}$) to employ as the control voltage. Suppose, as shown, the smaller voltage $E_{ad}$ is selected as the control voltage. Tube 104 is so biased that, when the controlled frequency is on the proper side of the difference frequency the resultant small voltage across resistor 96 has no effect on amplifier 104 and there is no energization of coil 106. Under these conditions the discriminator control proceeds as above related.

Suppose, however, that the controlled frequency is higher than the fixed frequency when the desired difference frequency is established. This means that the voltage $E_{ad}$ across resistor 96 will be considerably higher than before and sufficient to cause amplifier 104 to energize relay coil 106. Switch 107, 109 closes first, thereby shunting the discriminator output sufficiently to render the discriminator ineffective to control as above explained. The speed of operation of the relay depends on the delay characteristics and time constant of resistor 102 and condenser 103. The discriminator is now ineffective to control the frequency of oscillator 20.

A short time later switch 108, 111 closes to charge condenser 114 by an amount sufficient to cause the output of triode 66' on lead 18 to decrease the frequency of oscillator 20 until the latter is lower than the frequency of oscillator 34. The difference frequency having now changed so as to eliminate its control by the phase rotation indicator, relay 106 is deenergized and the relay switch contacts open. A residual charge remains on condenser 114 and this charge is effective to decrease the frequency of oscillator 20 for a period determined by the time constant of resistor 115 and condenser 114. That time constant is sufficiently large so that discharge of condenser 114 takes place in a time that is long enough to allow the phase discriminator to resume control, and operation proceeds to lock the oscillators in synchronism at the required frequency difference. Resistor 115 bypasses the direct current component of the discriminator output to the control grid of triode 66' and condenser 114 is sufficiently large so that the network 114, 115 does not seriously interfere with normal operation of the frequency correcting circuit described above with relation to Fig. 1. Both network 112, 113 and 114, 115 are of such design as not to change the designed attenuation characteristics of my frequency correcting circuit.

It is important that the polarity of the charging current for condenser 114 be such as to cause shift in frequency of oscillator 20 in the proper direction. The above control may obviously be effected through the use of only one resistor in the output of the phase rotation detector, and in such instance only one source of voltage at the proper polarity need be supplied at 116. However, where the operator has a choice of selecting either the lower or higher voltage output of the phase rotation indicator as illustrated, the ganged switch blades 99 and 119 will automatically provide the proper polarity of charging current for the condenser 114.

The automatic control arrangements of Fig. 14, or their mechanical or electrical equivalents, may be employed in any automatic frequency control system wherein two source frequencies are to be maintained at a required difference frequency, and the relative values of the two source frequencies are important.

All of the above described automatic frequency control arrangements are capable of wide usages, especially in superheterodyne circuits where the local oscillator may be controlled similarly to oscillator 20 herein.

It is important to render the discriminator output ineffective as above described, while applying the frequency shifting voltage by switch 108, 111, to prevent that circuit from simply becoming stabilized at a slightly different operating voltage with the oscillator 20 at wrong frequency. Also the operation of network 112, 113 in rendering the discriminator output ineffective to control the frequency correcting circuit is advantageous because it retains the degree of control already attained by the circuit.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. Electrical stabilization apparatus comprising two electric wave sources of which the frequencies of operation are to be maintained at a required frequency difference, means for obtaining a signal corresponding to the difference of frequencies of said sources, means responsive to said signal for controlling one of said sources for compensating for departures from said required difference and for restoring said required difference, and further means responsive to said signal for preventing restoration of said required difference except when the frequency of a predetermined one of said sources exceeds the frequency of the other of said sources.

2. In a frequency control system having a pair of sources of electric waves and apparatus for maintaining a fixed frequency difference between said sources including means responsive to departure of the frequency difference between said sources from a desired value for producing correction signals corresponding to said departure, the improvement comprising means adapted for frequency modulating the output of one of said sources by said signals and in a sense to restore said difference frequency to said desired value, and means adapted for preventing regenerative oscillations in said apparatus due to increase of said correction signals by action of said modulated output on said correction signal-producing means.

3. Apparatus for maintaining a source of electric waves at a desired frequency value, comprising means adapted to be coupled to said source and responsive to departure of the frequency of said source from the desired frequency for producing a corresponding correction signal, means adapted to be coupled to said source for frequency modulating said source by said signal, and phase-shift-controlling means in said modulating means for attenuating the modulation components of the modulated output of said source in accordance with controlled phase shift to prevent regenerative oscillation in said apparatus.

4. Frequency control apparatus comprising a tunable source of electric waves, electric signal responsive means for tuning said tunable source, means coupled to said tuning means and responsive to said tunable source for producing an electric signal varying according to variation of the frequency of said source from said predetermined frequency, said tuning means and said signal producing means forming an inverse feedback circuit responsive to variations of frequency of said tunable source from said predetermined frequency and operative on said tunable source to suppress said variations, and means connected to said feedback circuit for providing a predetermined attenuation versus frequency gradient for alternating components of said signal.

5. Frequency control apparatus comprising a tunable source of electric waves, a reference source of electric waves, the frequency of said tunable source being correlated in a predetermined manner to the frequency of said reference source, electric signal responsive means for tuning said tunable source, means coupled to said tuning means and responsive to said tunable source and said reference source for producing an electric signal varying according to relative frequency variations of said sources, said tuning means and said signal producing means forming an inverse feedback circuit responsive to the relative frequency variations of said tunable source and operative thereon to suppress said variations, and means connected to said feedback circuit for providing a predetermined attenuation versus frequency gradient for alternating components of said signal.

6. In a frequency control system wherein a tunable source of electric waves is provided with electric signal responsive means for tuning said tunable source, and wherein variations of the frequency of said source from a predetermined frequency are to be suppressed, the improvement comprising means adapted to be coupled to said tunable source for producing an electric signal varying according to variation of the frequency of said source from said predetermined frequency, circuit means adapted for coupling said signal producing means to said tuning means for applying to said tuning means a signal suppressing frequency variations of said source, and a frequency-responsive network comprising a capacitor and a resistor connected in series across said circuit means for controlling the phase and amplitude of the signal delivered to said tuning means from said signal producing means.

7. Frequency-stabilized oscillator apparatus comprising a tunable source of electric waves having an electric signal-responsive frequency control circuit, means responsive to the output of said tunable source for producing an electric signal varying according to variation of the frequency of said electric waves from a predetermined frequency, circuit means coupling said signal producing means to the frequency control circuit of said source for delivering thereto a version of said produced signal for regulating the frequency of said source, and a frequency-responsive network comprising a capacitor and a resistor connected in series across said circuit means for controlling the phase and amplitude of the signal version delivered to the frequency control circuit of said source from said signal producing means.

8. Frequency-stabilized oscillator apparatus comprising a tunable source of electric waves having an electric signal-responsive frequency control circuit, means responsive to said tunable source for producing an electric signal varying according to variation of the frequency of said source from a predetermined frequency, circuit means coupling said signal producing means to the frequency control circuit of said source for delivering thereto a version of said produced signal for controlling the frequency of said source, and a plurality of frequency-responsive networks each comprising a capacitor and a resistor connected in series, and each being connected across said circuit means for controlling the phase and amplitude of the signal version delivered to said frequency control circuit from said signal producing means.

9. Frequency-stabilized oscillator apparatus as defined in claim 8, wherein the product of the impedance values of resistance and capacitance in one of said networks is greater than the product of the impedance values of resistance and capacitance in another of said networks, whereby different ones of said networks provide maximum attenuation control in different frequency ranges.

10. Frequency-stabilized oscillator apparatus comprising a tunable electric wave source having an electric signal-responsive frequency control circuit, means responsive to deviations of the output frequency of said source from a predetermined frequency value for producing an electric signal varying according to said deviations of the frequency of said source, an electronic amplifier having an input circuit coupled to said signal producing means and an output circuit coupled to the frequency control circuit of said source for delivering thereto an amplified version of said produced signal, a first frequency-responsive network including series reactance and resistance connected across said input circuit of said amplifier, and at least one frequency-responsive network including series reactance and resistance connected across said output circuit of said amplifier.

11. Apparatus for producing an electric wave of frequency regulated to a predetermined algebraic difference from the frequency of a reference wave, comprising an electric-signal-responsive tunable electric wave source having an input circuit responsive to frequency control signals, means providing a reference wave, means responsive to said reference wave and said source for producing output signals varying according to relative variations of frequency of said reference wave and the electric wave produced by said source, means coupling said signal producing means to said frequency control input circuit to suppress said relative variations of frequency, a heterodyne frequency converter responsive to one of said waves for producing a heterodyne output wave at the frequency of the other of said waves, phase discriminator means responsive to said heterodyne output wave and said other wave for producing an output voltage indicating whether the frequency of said reference wave exceeds the frequency of the wave produced by said source, and means responsive to said discriminator means output voltage and operatively coupled to said signal producing means and said frequency control input circuit for preventing said signal producing means from controlling the frequency of the wave produced by said source when a predetermined one of the frequencies of said reference wave and the wave produced by said source exceeds the other of said frequencies.

12. Electrical apparatus comprising a pair of electric wave sources and means for stabilizing the operation of said sources at a required frequency difference with a selected one of said sources at a frequency value higher than that of the other, said stabilization means comprising means for producing a signal corresponding to the difference of frequencies of said sources, means responsive to said signal for controlling said one selected source for compensating for departure from said required difference and for restoring said difference, detector means coupled to said sources for producing a control voltage definitive of the sense of departure of the frequency of said one selected source relative to that of the other, and means responsive to said control voltage for rendering said signal-producing means ineffective to control said one selected source except when the frequency of the latter-named source is higher than that of the other.

13. The apparatus defined in claim 12 wherein said detector means comprises means for obtaining a phase-shifted version of the waves from one of said sources, means for producing a pair of equal and oppositely sensed components of the waves from the other of said sources, and means for combining said phase-shifted version of the waves from said one source with one of the components of the waves of the other source to produce said control voltage.

14. The apparatus defined in claim 12 wherein said last-named means comprises a resistance-capacitance network coupled to said signal-producing means, and switching means connected between said resistance-capacitance network and said detector means, said switching means having means responsive to said control voltage for by-passing the resistance of said network.

15. The apparatus defined in claim 12 wherein said last-named means comprises a resistance-capacitance network coupled to said signal-producing means, and switching means conjointly connecting said signal-producing means and said control means to said detector means, said switching means including means responsive to said control voltage for by-passing the resistance of said network, thereby rendering said signal ineffective to energize said control means, and further means responsive to said control voltage and energizable slightly later than said control-voltage-responsive means for applying a unidirectional voltage to said control means whereby variation of the frequency of said one selected source is obtained independently of the frequency-controlling signal.

16. Frequency stabilization apparatus comprising a source of electric waves, discriminator means coupled to said source for producing a first control signal corresponding to deviations of the frequency of said source from a desired frequency condition, control means responsive to said first signal for altering the frequency of said source to minimize said deviations, detector means coupled to said source for producing a second control signal corresponding to the sense of deviation of the frequency of said source from said desired frequency condition, and switching means including a source of unidirectional voltage and connected between said discriminator means and said control means, said switching means being responsive to said second control signal for rendering said first control signal ineffective to control said source and for applying a unidirectional voltage to said control means for altering the frequency of said source except when the detected sense of deviation corresponds to a predetermined sense relation relative to said desired frequency condition.

VINCENT R. LEARNED.

REFERENCES CITED

The following references are of record in the file of this patent:

UNITED STATES PATENTS

| Number | Name | Date |
|---|---|---|
| 1,907,965 | Hansell | May 9, 1933 |
| 2,054,676 | La Pierre | Sept. 15, 1936 |
| 2,106,776 | Trevor et al. | Feb. 1, 1938 |
| 2,128,642 | Foster | Aug. 30, 1938 |
| 2,173,301 | Kinross | Sept. 19, 1939 |
| 2,241,937 | Trevor | May 13, 1941 |
| 2,245,627 | Varian | June 17, 1941 |
| 2,245,710 | Rado | June 17, 1941 |
| 2,248,753 | Green | July 8, 1941 |
| 2,266,065 | Muller | Dec. 16, 1941 |
| 2,270,243 | Bach | Jan. 20, 1942 |
| 2,273,097 | Foster et al. | Feb. 17, 1942 |
| 2,279,659 | Crosby | Apr. 14, 1942 |
| 2,294,942 | Varian et al. | Sept. 8, 1942 |
| 2,295,629 | Bond | Sept. 15, 1942 |
| 2,324,077 | Goodale et al. | July 13, 1943 |
| 2,328,985 | Luck | Sept. 7, 1943 |